United States Patent [19]

Balston et al.

[11] Patent Number: 4,672,600
[45] Date of Patent: Jun. 9, 1987

[54] OPTICAL DISC HAVING PROTECTIVE COVER

[75] Inventors: Neil K. Balston, Edmonton; Keith D. Anderson, Ottawa; Herman W. Willemsen, Stittsville, all of Canada

[73] Assignee: Northern Telecom Limited, Montreal, Canada

[21] Appl. No.: 835,927

[22] Filed: Mar. 4, 1986

Related U.S. Application Data

[63] Continuation-in-part of Ser. No. 555,344, Nov. 28, 1983, abandoned.

[51] Int. Cl.$^4$ .......................... G11B 23/00; G11B 7/00
[52] U.S. Cl. ..................................... 369/275; 369/283; 369/14
[58] Field of Search ................ 369/14, 15, 16, 48, 369/94, 95, 111, 275, 284, 283, 44

[56] References Cited

U.S. PATENT DOCUMENTS

| | | | |
|---|---|---|---|
| 4,094,013 | 6/1978 | Hill et al. | 369/44 |
| 4,108,365 | 8/1978 | Hughes | 369/14 |
| 4,331,966 | 5/1982 | Moe | 369/275 |
| 4,385,372 | 5/1983 | Drexler | 369/275 |
| 4,387,381 | 6/1983 | Bell | 369/275 |
| 4,450,553 | 5/1984 | Holster et al. | 369/275 |

FOREIGN PATENT DOCUMENTS

| | | | |
|---|---|---|---|
| 70031 | 1/1983 | European Pat. Off. | 369/275 |
| 53-117402 | 10/1978 | Japan | 369/14 |

Primary Examiner—Robert L. Richardson
Attorney, Agent, or Firm—Schwartz, Jeffery, Schwaab, Mack, Blumenthal & Evans

[57] ABSTRACT

An optical disc assembly has an optical disc and a protective cover. The optical disc has a surface adapted to have optically recorded thereon data consisting of a series of laser ablated pits recorded as a series of concentric data tracks. The pits have small size and high surface density. The protective cover has a permanent optical recording at one surface thereof consisting of a series of visible marks. The marks are an order of magnitude larger than the pits and have a much lower surface density. Memory data is recorded on the optical disc and positional data, comprising a map of the memory data surface, is recorded on the cover. This allows the use of separate positional data and memory data monitoring channels which facilitates the recording of a blank optical disc and subsequent memory data access.

6 Claims, 4 Drawing Figures

OPTICAL DISC HAVING PROTECTIVE COVER

This application is a continuation in part of U.S. application Ser. No. 555,344 filed Nov. 28, 1983. now abandoned

FIELD OF THE INVENTION

This invention relates to an optical disc assembly for use as an optical memory.

DESCRIPTION OF THE RELATED ART

Analogous in some respects to the familiar audio disc, information on an optical or video disc is stored on the disc surface as laser ablated pits of approximately 1 micron across, the pits located along a single spiral track or multiplicity of concentric tracks with a track spacing of approximately 2 microns. The disc is both written and read by a beam of laser light focussed to a spot of about 1 micron at the disc surface. In the write mode, the focussed laser light displaces pits in the disc surface and in the read mode, the relatively lower energy laser light is used to monitor data corresponding to the detection of successive pits as the disc rotates. A reflected beam is monitored and from this, information that has been recorded is derived.

Two types of discs are currently most common. One type, known as a sealed disc assembly, has a central hub and outer circumferential ring between which two layers, a recording layer, typically of 2.5 millimeters thick aluminum and a cover sheet of Mylar ® or other plastic material are stretched taut. Separation of the sheets is ensured by spacers and by tensioning the cover sheet. Tension must be uniform in order that the cover sheet is not birefringent. The cover sheet must also be of uniform thickness and high stability. If the cover sheet does not have these properties then read light which is directed through the cover sheet to be focussed at the data surface is sensitive to polarization direction and the focussed spot tends to oscillate in position and possibly change size as the disc rotates.

In another example of optical disc, a cover film typically of polymethacrylate overlies and directly contacts the recording surface of the disc. Other examples of optical recording discs are known but most of those currently used have a protective layer either directly contacting, or spaced from, the memory recording surface of the disc.

One of the requirements for using an optical disc as a high density memory device, storing typically 2 gigabytes on a 30 centimeter outer diameter disc, is that the stored data should be accessed as quickly as possible. For a disc of this size, an acceptable access time for moving a read beam from a rest position to a designated read position to commence reading the stored data is 100 milliseconds. To ensure a fast access time, an accurate and rapid servo system is required so that from the moment that movement of the read beam commences, the position and velocity of the read beam is accurately monitored and required subsequent movement to read the target data is continuously and accurately predicted.

One aid to such a servo system which has been used in known optical discs are the spiral or concentric tracks consisting of stored data.

In one access scheme, repeated, position-characteristic header data or address fields are stored within several data tracks so that as a scanning beam radially traverses the disc, the header data is monitored. To access a track between any two successive header data tracks, the intervening data tracks are simply counted as a decelerating scanning head moves across them. As the scanning beam nears the target track, the rate at which the scanning beam crosses the tracks is reduced still further and eventually the scanning head is halted at the target track to read the target data. The data as well as occupying a track at a particular radial position is also in a predetermined arc of that track and it is important therefore to know where the disc is circumferentially relative to the scanning beam. In known optical discs, the data tracks have data sequences indicative of a circumferential index position on the disc.

As well as providing information from which its position can be determined, the scanning beam is also used to derive other information from the disc. Most importantly, it must read the memory data. It must also ensure that the scanning beam itself remains centrally on a particular track as long as it is required there. It must ensure too that the scanning beam is focussed at the surface of the track in order accurately to monitor the light variations corresponding to both memory-related and position-related data.

As indicated previously, the memory and position control data is typically recorded as a succession of pits and lands which together make up data tracks, the pits and lands causing a certain change in monitored light as the disc rotates underneath the scanning beam. The monitored change may be a change in reflectivity, scattering, or diffraction pattern.

One problem in using such data tracks is that initially, before data has been recorded on the disc, no tracks as such exist to assist in setting data correctly on the blank disc.

Secondly, any part of the data recording surface used for storing positional data cannot be used for storing memory data.

Thirdly, the high surface density data although ideal as memory data, is not particularly adapted to provide positional data for use by a servo system in controlling the scanning beam. For the latter purpose, positional data which is more gross and has a lower surface density than the memory data would be more suitable.

In this specification, it will be understood that data is optically recorded data recorded in binary form, for example as discrete relatively light and dark regions, or relatively reflecting and non-reflecting regions, etcetera. The "surface density" of data is a measure of the number of such regions in a unit area, a high surface density connoting a high number of such regions in a unit area. The "grossness" of data is a measure of the size of such a region.

Bruce et al, "Video Disk with Updating Feature", IBM Tech, Disc. Bulletin, Vol. 22, No. 3, Aug. 1979, p 1183 describe an optical video disc with a magnetic layer which can also serve as a protective layer, the magnetic layer being used for indexing of the optical data. Bruce et al teach mounting magnetic and optical read heads in conjunction. The video disc data is high surface density data and the magnetic layer is low resolution data. In Bruce et al, the top layer is made updatable to permit the alteration of identifying data as data is logged on the underlying optical disc surface. Since the identity of data on the Bruce et al cover is to be changed periodically, a recording medium which is erasable and re-writable is needed. Hence, Bruce et al use a magnetically recordable top layer.

SUMMARY OF THE INVENTION

According to one aspect of the invention, there is provided an optical disc assembly comprising an optical disc and a protective cover, the optical disc adapted to receive thereon an optical recording consisting of a series of laser ablated pits recorded as a first series of concentric data tracks, said pits being of a predetermined size and surface density, the protective cover having thereon a permanent optical recording consisting of a series of visible marks, the size of the pits being an order of magnitude smaller than the size of the marks and the surface density of marks being an order of magnitude smaller than the surface density of the pits in the tracks.

Preferably, the marks are relatively light-absorbing printed regions but can alternatively be relatively rough or embossed regions on said cover.

Preferably, data on the protective cover is positional data used to map the underlying optical disc. To this end, the cover can have an outer marginal region in which is stored relatively high surface density, radially extending encoding marks and an inner marginal region in which are stored lower surface density radially extending sector marks, the sector marks including a unique index mark. Said unique index mark can provide a circumferential start position from which sector marks signifying the circumferential start position of memory data packets stored or to be stored on the optical disc are referenced. The rate at which a dedicated scanning beam traverses the more densely positioned encoding marks can be used to compensate for variation in disc rotational speed.

The cover data can further comprise a series of data tracks in an annular area radially inwardly of the area overlying an annular read/write zone on a recording surface of the underlying disc. Positional data in the data tracks of said annular area of the cover can be used initially for setting the position of memory data to be recorded on blank portions of the annular read/write zone. Such data can be used also for monitoring and controlling radial movement of a scanning beam for memory data access.

Radially inside said annular area, the cover can have recorded thereon a reference or closure track and disc identifying data. The inside reference track can be used to ensure that a blank disc is accurately centered before memory data is first written. The closure track thus acts as a reference to ensure that memory data is not eccentrically loaded on the optical disc. The identifying data marks can be a simple bar code to differentiate the particular optical disc from others.

The positional information can be optically recorded on the protective cover surface in any of a number of ways. Firstly, it can be a series of dark and light areas produced for example by selectively printing a dark film on the cover. When the positional data scanning beam traverses the disc cover, the positional data is monitored as successive changes in reflectivity. The reflectivity of the cover sheet must not however, vary by more than 2 percent otherwise the transmission of a scanning beam for scanning the memory surface is non-uniformly affected with the attendant risk of reading memory data incorrectly.

Secondly, the data can be a series of rough and smooth areas produced for example by selectively etching the protective cover through a mask. When the positional data scanning beam traverses the disc, the positional data is monitored as successive changes in scattering.

Thirdly, the data can be a series of pits and lands produced by etching. When the positional data scanning beam traverses the disc cover, the positional data is monitored as successive changes in a diffraction pattern.

Typically, the positional data on the cover is recorded as linear elements of the order of 50 microns wide.

In using the disc assembly, at least one positional data scanning beam is used which is distinct from a memory scanning beam used to read the memory data at the optical disc recording surface. Because the scanning beams are focussed at different levels and at different lateral positions and because the data bits which they read are an order of magnitude different in size and surface density, the light which is reflected from the memory surface into a positional data channel, and light reflected from the positional surface into a memory data channel, do not cause error.

The positional data recording surface is preferably the outer surface of the protective cover although it could be the cover inner surface. Because positional data stored at the cover surface is relatively more gross and has a low surface density in comparison to memory data stored at the optical disc surface, then the outer protective surface of the disc may have dust or contaminants adhering to it without incurring error.

One method of recording the positional data is by photolithography to produce regions which are relatively dark.

In another alternative particularly for an optical disc formed with a protective film contacting the memory data recording surface, the film can be embossed using a master disc negative.

BRIEF DESCRIPTION OF THE DRAWINGS

An embodiment of the invention will now be described by way of example, with reference to the accompanying drawings, in which.

DESCRIPTION OF THE PREFERRED EMBODIMENTS

Figure 1:
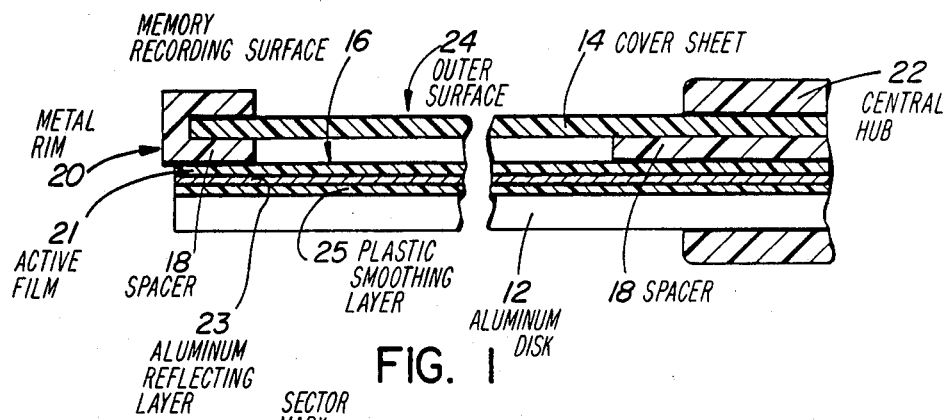
FIG. 1 is a cross-section, not-to-scale, through part of an optical disc assembly according to the invention.
Figure 2:
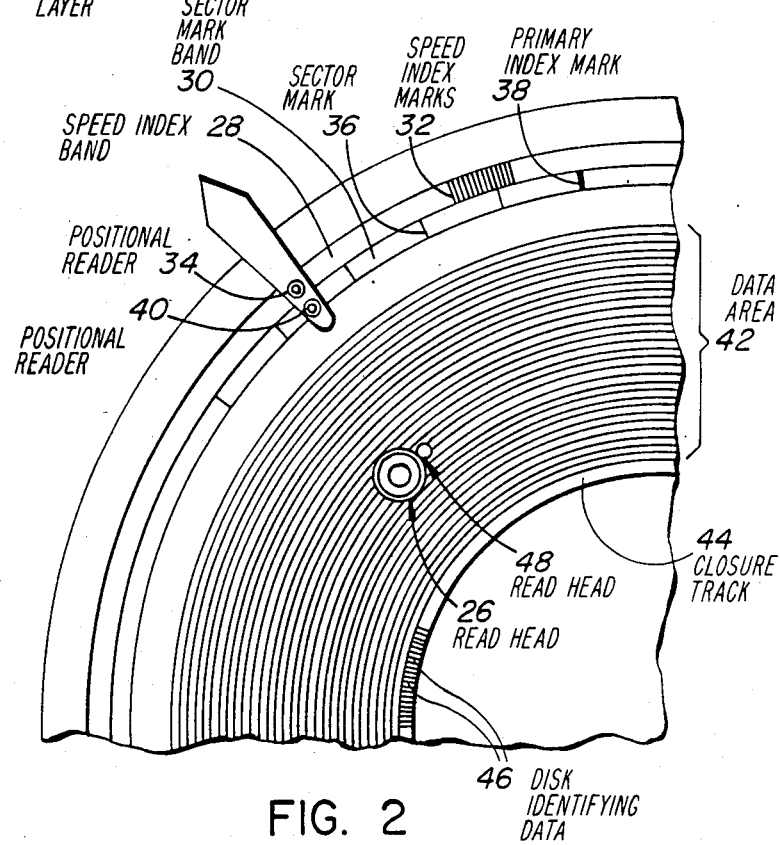
FIG. 2 is a schematic plan view of part of a protective cover of the FIG. 1 optical disc assembly.

Referring to FIGS. 1 and 2 in detail, there is shown an optical disc assembly 10 for use as an optical memory. The assembly has a 30 centimeter diameter, 2.5 millimeter thick optical disc 12 of aluminum. Overlying the disc is a cover sheet 14 of Mylar ® which functions to protect a memory recording surface 16 of the underlying disc 12 from dust and contaminants. The 100 micron thick layer 14 and the aluminum recording disc 12 are spaced apart by spacers 18 and are uniformly tensioned between a metal rim 20 and a central hub 22.

At an exposed outer surface 24 of the protective cover 14 is stored positional data and at the protected upper surface 16 of the aluminum disc 12 is stored memory data. The memory data consists of a series of pits and intervening lands, the pits 15 typically being 1 micron across and of 1.5 micron spacing and forming concentric data tracks. In contrast, the positional data on the cover exists as a series of printed marks 17 of about 50 microns in width.

To write on a blank disc, that is, to form the pits at the memory surface 16, the optical disc assembly is rotated on a turntable under a write head (not shown). The write head includes a 10 megawatts gallium arsenide diode laser which is driven to provide 50 to 100 nanosecond pulses. Light from the laser is focussed at the memory surface 16 of the optical disc 12 and is guided to a desired radial positon on the optical disc by an optomechanical drive. Then at selected angular positions of the optical disc assembly, the diode laser is energized momentarily. The action of the laser beam is locally to displace regions of an optically active film 21 on the substrate to create pits about 1 micron across and 50 nanometers deep, the displaced material being partly relocated and partly vapourized. The optically active film 21 is a 150 nanometer dye polymer layer which overlies firstly a 40 nanometer aluminum reflecting layer 23 and secondly a 1000 nanometer plastics smoothing layer 25. The diode laser is driven on and off in accordance with a digital data signal when the laser beam is focussed at a selected region of the disc memory surface.

The encoded data at the optical disc surface is subsequently read using a read head shown generally as 26 in FIG. 2. The read head has a lower power laser, typically a helium-neon laser with an output wavelength of 633 nanometers and continuous wave power output of 0.25 megawatts. The digitally encoded signal is monitored by analyzing the change in diffraction pattern of diffracted light as discontinuities corresponding to the boundaries of pits pass under the read beam. Other read out methods can be used depending on the type of optically active film used.

Particularly for use in high density optical memories in which typically more than 2 gigabytes are stored in a 30 centimeter diameter disc, there is a need to access memory data quickly and accurately. To access such data, the optical read head 26 moves radially outward from a reference position as the optical disc assembly 10 rotates beneath the head. Simultaneously, positional data is read from the disc assembly using a second read head 48 physically mounted with the read head 26. This data is processed to ensure that the read head 26 moves quickly towards a position at which the target item of memory data can be read.

By this invention, the positional data is mainly or wholly recorded on the surface 24 of the protective cover 14 and not on the memory surface 16 as is common in known optical disc systems.

In the embodiment shown in FIGS. 1 and 2, positional data is encoded optically as variations in surface reflectivity of the protective cover. As shown in the plan view of FIG. 2, the positional data occupies a number of zones.

Firstly, there are two series of optical encoding radial marks occupying marginal bands 28 and 30 of about 0.1 millimeter width at the outer edge of the cover. The first band 28 has 5,000 marks 32. A fixed positional reader 34 is used to count the rate at which the marks pass under it in order to regulate the disc speed. Radially within this band is a second band 30, the sector mark band, the sector marks 36 indicating the position of address or header data within the encoded data within the memory surface. Typically the sector mark band has 128 marks one of which is a primary index mark 38. A second fixed positional reader 40 is used to monitor sector data.

Inside this band is an annular area substantially in vertical registration with an annular read/write area of the underlying memory surface 16. For a 30 centimeter disc there are 300 positional data tracks within this area corresponding to 30,000 memory data tracks on the underlying memory surface when fully recorded.

Radially inward of area 42 is a reference band which includes firstly, a closure track 44 and secondly, disc identifying data 46. The closure track is used following positioning of the disc assembly on a turntable to assess whether closure of data tracks can be expected. If the disc assembly is eccentrically positioned, then the extent of this is monitored and, if it is too great for the memory read head 26 to compensate for, then the disc is repositioned using the centering hub 22. The identifying data 46 is recorded simply as a bar code, individual elements of which extend radially, the code itself extending circumferentially.

Data in the annular area 42, the reference band containing the closure track 44 and identifying bar code are read by the read head 48 which shares a common mechanical drive with the memory read head 26 but has an optical system which is at least partly distinct from the optical system associated with read head 48.

Figure 3:
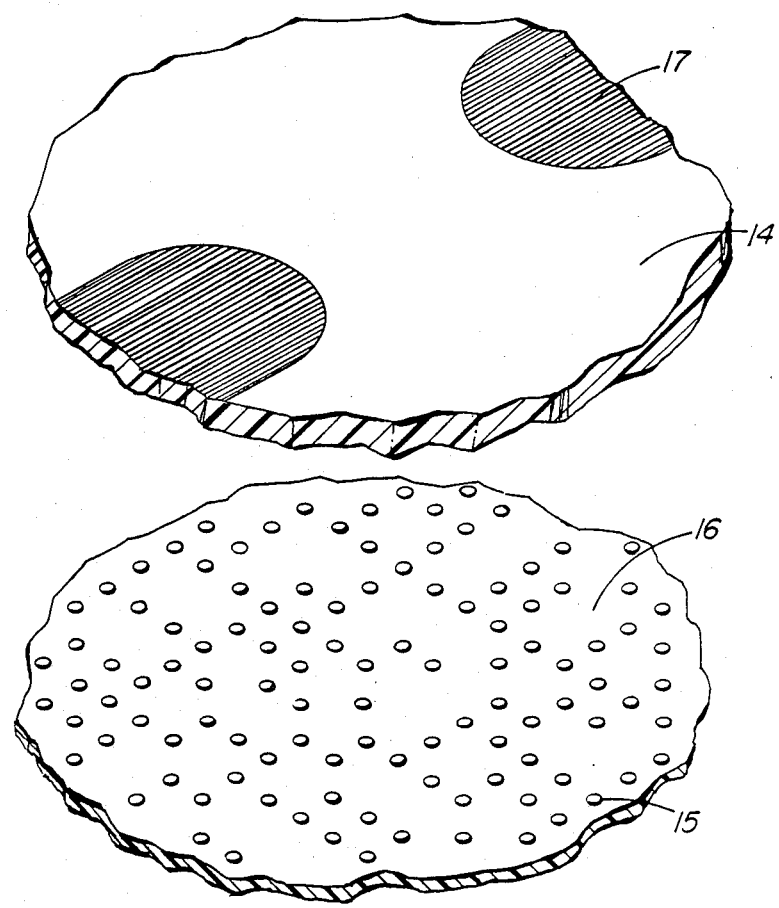
FIG. 3 shows a detail, in perspective, of the cover and the underlying disc of the FIG. 1 assembly.

The read head 48 has a rest position adjacent to the center of the disc assembly. In this position, the corresponding scanning beam monitors the identifying bar code and the closure track for assessing disc identity and eccentricity. Then when an item of data at the memory surface is to be accessed, the two heads 26 and 48 move radially outwards at high speed with the control system of FIG. 3 being actuated.

As previously indicated, the optical recording on the protective cover 14 takes the form of periodic variations in reflectivity. To obtain this, a pattern is printed on the top surface of the cover using photolithography. The printed material is a developed photoresist which is compatible with Mylar ®, and is highly stable and abrasion resistant. The film is less than 10 microns thick to produce a contrast in reflectivity compared to the unprinted Mylar ® of less than 2 percent. A low contrast is important since if contrast is too high, then accuracy of reading of the memory data can be detrimentally affected. As an alternative to developing a photoresist film through a mask, the pattern is screen printed.

As an alternative to printing onto the top surface of the cover sheet, selected regions of the cover sheet are roughened to cause a variation in scattering of a positional read beam. To do this, a mask is formed over the protective cover which is then etched by sputtering or reactive ion etching through windows in the mask.

In yet another alternative, the cover sheet is scribed with a needle such as a phonograph type diamond stylus.

For a disc which, in contrast to that described in FIGS. 1 and 2, has a thick film typically of polymethylmethacrylate in contact with the memory surface, the positional data on the cover surface can be formed by embossing. To do this a master disc is formed by scibing a copper sheet and then nickel plating the scribed surface. The master disc is then pressed onto the film of polymethyl methacrylate after heating to render the film deformable. This technique is well known in the production of phonograph records.

Figure 4:
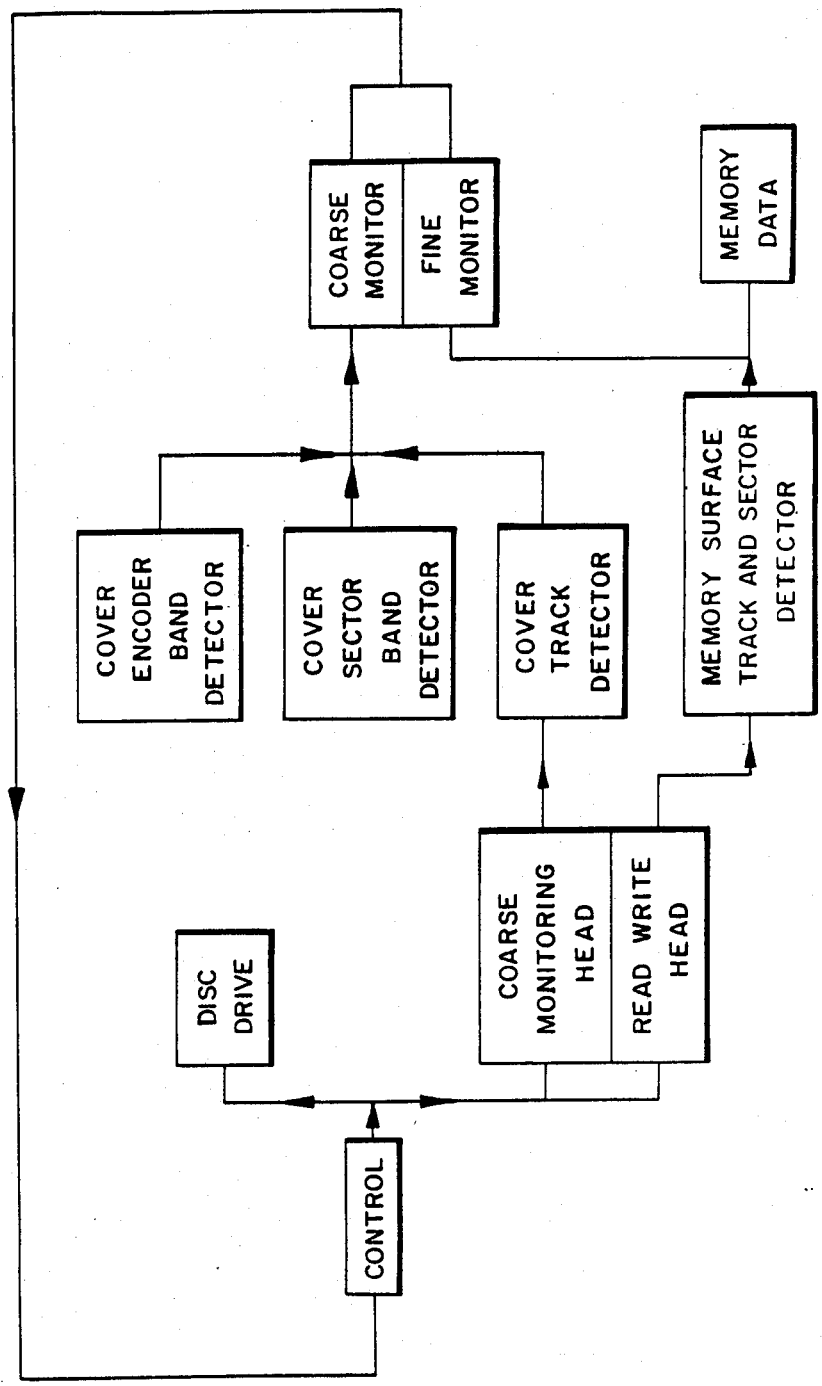
FIG. 4 is a block schematic view of a control system for use with the optical disc assembly.

Referring to FIG. 4, there is shown in schematic form a control system for use with the disc of FIGS. 1 and 2.

Essentially in use when accessing a data item, positional data on the protective cover is initially used to obtain a coarse evaluation of the actual position and movement of the physically combined read/write and coarse monitoring heads 26 and 48 respectively, so that the required movement of the read/write head 26 to access the data item can be predicted. Initially, the tracks on the cover sheet are counted as they are successively crossed by the coarse monitoring head 48. As the read/write head nears the target track, data in the cover tracks is read to confirm that the head position are assessed from the data track count is correct. The coarse monitoring system is then switched out and a fine, high resolution monitoring system using the data channel from the memory surface is utilized. As shown in FIG. 4, the encoder band and the sector band on the cover are also monitored and the data obtained are used respectively to control the disc drive and the timing of data writing and reading at the memory surface by the read/write head 26.

Details of the monitoring and control system are not shown since they exist in known optical disc monitoring and control systems in which control of read/write head movement is based on positional data present on the memory recording surface. However it will be recognized that a monitoring system used to interrogate data on the protective cover need not be so complex nor so difficult to set up as one for obtaining data from the memory surface since no separation or discrimination between the positional data channel and the memory data channel is required. Further the cover read head need not have such an accurate beam focussing mechanism as the disc read head. In addition, for cover data, a relatively slow counter can be used to monitor track crossings and data analysing circuitry need not be so complex since there is little risk of confusing the identity of radially adjacent tracks on the cover.

Multilayered optical discs have been proposed by for example, Thompson - CSF. However, these known discs differ from the currently proposed disc in that the multiple recording surfaces are of the same type, the recorded data at each surface consisting of a combination of positional and memory data, and the data at the several surfaces being encoded at the same bit size and surface density.

It will be recognized that whereas in the embodiment described, positional information is recorded only on the protective cover and not at all on the memory data surface, some positional data could be stored at the memory data surface. Also, the positional data on the cover sheet, further gross, low surface density data may also be carried. For example, this can include a disc serial number, and a list of optical disc sectors which should not be used owing to their being flawed.

What is claimed is:

1. An optical disc assembly comprising:
    an optical disc and a protective cover; said optical disc having a radial dimension and being adapted to receive thereon an optical recording comprising a series of laser ablated pits recorded as a series of concentric data tracks, said pits being of a predetermined size and surface density; said
    protective cover having thereon a permanent optical recording comprising a series of visible, optically readable marks, the size of said optically readable marks being an order of magnitude greater in said radial dimension of said optical disk than the size of said pits, and the surface density of said optically readable marks being an order of magnitude smaller than the surface density of said pits in the data tracks, said optically readable marks having a predetermined positional relationship with respect to said concentric data tracks so that a coarse indication of the position of said concentric data tracks is provided by said optically readable marks, said predetermined positional relationship including each of said optically readable marks being positioned over a plurality of radially spaced pits.

2. An optical disc assembly as claimed in claim 1 in which said optically readable marks are relatively light absorbing printed regions on said protective cover.

3. An optical disc assembly as claimed in claim 1 in which said optically readable marks are relatively rough regions on said protective cover.

4. An optical disc assembly as claimed in claim 1 in which said optically readable marks are embossed regions on said protective cover.

5. An optical disc assembly as claimed in claim 1 in combination with a first read head for sensing said pits, and a second read head for sensing said optically readable marks.

6. An optical disc assembly as claimed in claim 1 including sector marks for dividing said optical disc into sectors, said sector marks being spaced along an arc positioned radially outwardly of said pits.

* * * * *